Aug. 15, 1972   A. E. ANDERSON ET AL   3,684,637
SIMULATED LEATHER LAMINATE AND ITS PREPARATION
Filed Dec. 18, 1970
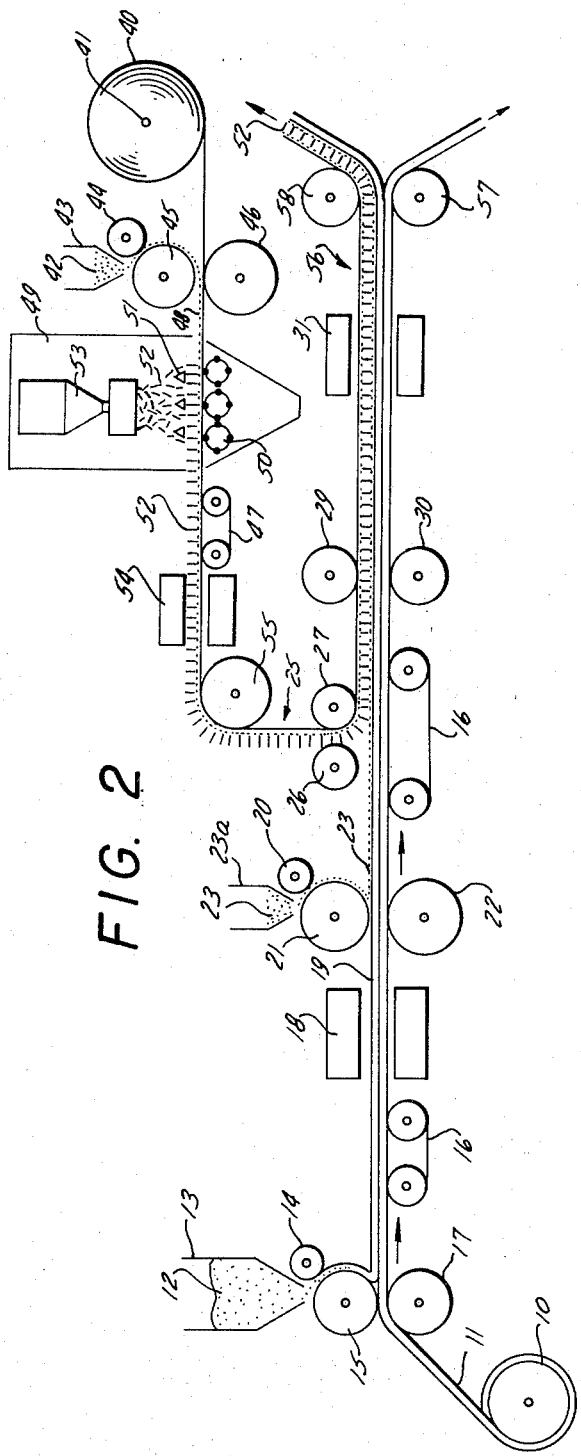
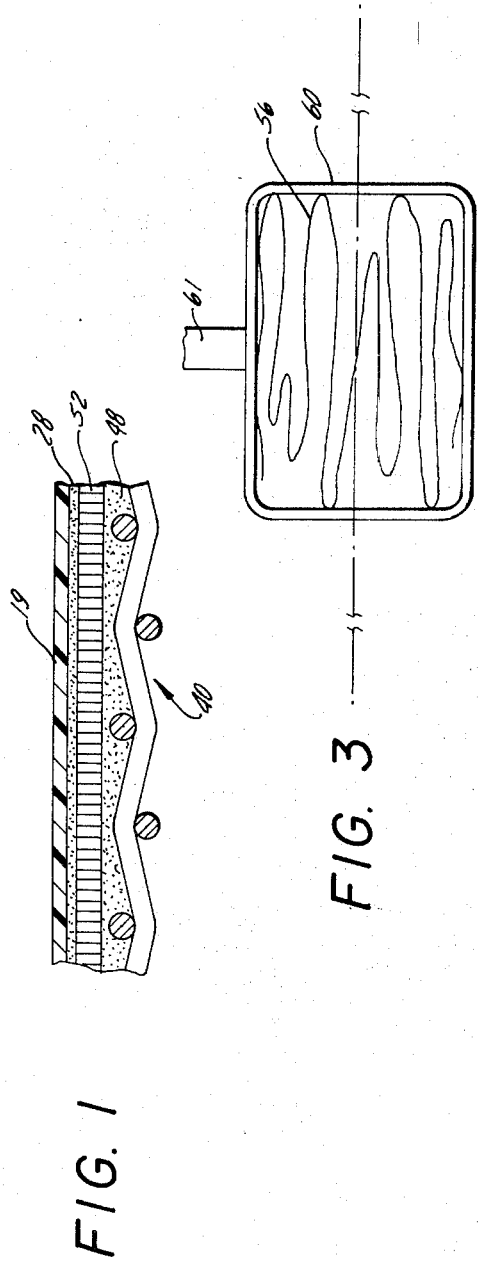
INVENTORS
ALBERT E. ANDERSON
ELLIS V. DISCH
BY *A. A. Orlinger*
ATTORNEY

United States Patent Office 3,684,637
Patented Aug. 15, 1972

3,684,637
SIMULATED LEATHER LAMINATE
AND ITS PREPARATION
Albert E. Anderson, 21 Indian Hill Lane, and Ellis V. Disch, 26 Carrol Ave., both of Norwich, Conn. 06360
Filed Dec. 18, 1970, Ser. No. 99,341
Int. Cl. D04h 11/00
U.S. Cl. 161—64                                    12 Claims

ABSTRACT OF THE DISCLOSURE

This invention relates to a method for producing a laminose sheet material and the laminose sheet material which has an outer face or surface skin coat of a non-tacky, set pliable-film-forming resin outwardly appearing like simulated leather, bound to a pliable fabric or plastic film base layer through an intermediate layer of flock whose individual fibers appear in substantially parallel array to one another.

---

This invention is that of a laminose sheet material having an outer face or surface skin coating (or ply) of a non-tacky, set pliable-film-forming resin outwardly appearing like simulated leather, bound to a pliable fabric or plastic film base layer through an intermediate layer of flock whose individual fibers appear in substantially parallel to one another array with one end of them imbedded integrally in a set film of flock-adhesive firmly adhering to the inner side of the pliable base layer film (e.g., body fabric) and with the other end of the flock fibers similarly integrally imbedded in another such flock adhesive film firmly adhering to the inner (i.e. under) surface of the outer skin coating, all as an overall unitary, pliable laminate.

Generally, the density of the flock and the length of its individual fibers is such that the spacing between the underside of the surface skin and the inner side of the body fabric is indiscernible to the naked eye. These simulated leather appearing laminates of the invention are useful in many applications such as for shoe body leathers, making belts, ladies' handbags, zipper briefcases, other carrying cases and luggage articles, and various articles of wearing apparel.

The invention also is that of the method of preparing these laminates, for example, by first casting a continuous coating of a solution of a flexible-film-forming resin (which on drying sets to a continuous pliable film) on an elongated carrier sheet from which the finished pliable film readily can be released, and drying that coating to set to its non-tacky pliable state; separately applying over one surface of an elongaged web of, for example, a fabric a substantially uniform, continuous coating of a flock-adhesive and before it sets applying over it a dense layer of flock by means enabling its fibers to become imbedded in the adhesive with the individual fibers held therein with one end extending relatively perpendicular to the fabric sheet and in substantially parallel array to one another; and after causing that adhesive to set, applying over one surface of the earlier mentioned pliable film a flock-adhesive compatible with that film and bringing its adhesive-coated surface and the flocked surface of the fabric web base together to enable the free ends of the flock fibers to become imbedded in the adhesive on the pliable film; and then drying that latter adhesive to set, to provide a finished laminate with the flock sandwiched between the opposed adhesive films and thereby integrally adhering to the underside of the pliable resin film and the inner surface of the base fabric.

The method of the invention and its product are explained more fully in the more detailed description given below in relation to the accompanying drawings wherein:

FIG. 1 is a greatly magnified cross-section through the thickness of a portion of the finished product;

FIG. 2 is a schematic diagram of an assembly of apparatus to enable conducting the method of the invention and producing its laminate product; and FIG. 3 is a vertical elevation of a means, namely, a small dimensioned loop, through which the laminate product is drawn into crushed together form to develop a wrinkled natural leather appearance on its outer surface.

In FIG. 2, numeral 10 identifies the supply roll of the elongated, relatively liquid-impermeable release-surfaced carrier sheet 11 which receives the starting solution of the flexible-film-forming resin from which is prepared the plastic film outer surface skin 19 (FIGS. 1 and 2) of the laminate end product. This later resulting plastic film 19 still later has to be readily separated or stripped from carrier sheet 11. Accordingly, the latter has a working surface inert to whatever film-forming resin dispersion 12 is to be applied to it and possessing a low enough degree of adhesiveness to that solution and the resulting pliable film (i.e. that surface skin coating) to be obtained therefrom.

Carrier sheet 11 then may be a smooth metal band or solution-resistant, liquid-impervious belt of suitable material such as fabric or paper having at least its operating surface treated in manner well known in the art to give it the needed smoothness and resistance to any solvent in the solution of the film-forming resin and to avoid permanent bonding to the resulting layer of film-forming resin so as to be only readily strippably adherent to it. Carrier sheet 11 also needs to be sufficiently heat resistant to avoid damage from the heat used in evaporating the solvent and drying and setting the resulting resinous film.

The starting film-forming resin dispersion 12 is applied to the receiving surface of carrier sheet 11, beneficially in the form of a solution thereof, although possibly in certain cases as a dispersion in colloidal state or of finely divided particles approaching such state in a compatible liquid medium, which particles may coalesce or flux under applicable conditions.

Such solution, or dispersion of particles dispersed in a liquid vehicle, both conveniently broadly referred to as the liquid dispersion, can be furnished from any suitable supply tank through its feeding outlet 13 into the nip or trough formed at about where the doctor or meter roll 14 and applicator roll 15 meet. The feeding rate of liquid dispersion 12 to applicator roll 15 is controlled by adjusting the setting of meter roll 14 and applicator roll 15 relative to one another, thereby in turn governing the desired resulting thickness of the final film.

The travel of carrier sheet 11 (in the direction shown by the arrow) picks off and transfers the liquid dispersion in the form of a continuous film from applicator roll 15 and supports it through its later handling steps. Back-up roll 17 guides and supports carrier sheet 11 as it is propelled, for example, by vacuum propulsion belts 16 of well known design and which can be equipped to enable varying linear speed within a suitably desired range to enable depositing on carrier 11 a suitable layer of the starting resin dispersion to provide the flexible plastic film of desired thickness.

As carrier 11 then continues in its movement it conveys the continuously being picked off layer of liquid dispersion 12 through drying oven 18 (equipped for suitable heating by either hot air or heating plates, not shown) to drive off the solvent and any other liquid vehicle constituents of the liquid dispersion, whereby on leaving oven 18 carrier 11 now conveys the resulting pliable resin film 19 strippably adhering to it due to the low degree of adhesion.

Carrier sheet 11, which thus serves to enable film 19 to retain its originally set dimensions, then conveys the pliable resinous film 19 to a second liquid film or adhesive applying-combination wherein doctor or metering roll 20 and applicator roll 21 form between them a trough (just as occurs between rolls 14 and 15) which receives and meters out over the feeding side of applicator roll 21 a suitable film of an adhesive solution 23 from its source 23a. Then as carrier sheet 11 conveys the plastic film 19 between and past applicator roll 21 and supporting roll 22, the adhesive solution coating 23 is taken off and transferred to the exposed upper surface of plastic film 19.

In the meantime, the elongated web of fabric 40 is drawn off of its supply roll 41 and is passed to and through another adhesive solution applying-combination where adhesive solution 42 is fed from its supply source 43 to and through the trough formed by doctor or metering roll 44 and applicator roll 45. There, as fabric 40 is drawn over supporter roll 46 by another vacuum propulsion belt 47, fabric 40 takes off onto its upper surface from applicator roll 45 an overall continuous film 48 of the adhesive solution 42.

While this adhesive film 48 is still wet, fabric web 40 passes into the flocking chamber 49 of a flocking machine and continues in its travel therethrough over the beater bars 50 and between them and the electrostatic field-providing grids 51. These latter cause the flock fibers 52 coming from the flock supply source 53 to arrange themselves and fall in substantially vertically parallel to one another array whereby the flock fibers then impinge vertically onto the wet adhesive solution surface so that only one end of the individual fibers becomes imbedded in the adhesive with the fibers extending vertically therefrom.

The flocking machine conveniently can be, and generally is, equipped with a vacuum exhaust (not shown) just beyond the exit from where the now flocked fabric 25 (i.e. fabric web 40 with attached flock 52) leaves the flocking chamber, so that any loose excess fibers which are not bound in the adhesive binder are removed from those imbedded in the adhesive and recovered for further use. Thereafter, the flocked fabric 25 is conveyed on through an oven 54 which serves to dry and set the adhesive, and then beneficially over a combined support roll and cooler drum 55.

The flock-coated fabric 25 then is guided down through guide rolls 26, 27 to allow the fabric by its own weight to extend to, and for the outer ends of the flock fibers 52 to engage in the still wet adhesive film 23 and for the flocked fabric 25 with the flock fibers 52 imbedded in adhesive 23 to continue with it and thus go on jointly with the flexible resin film 19 as a composite laminate through the vertically opposed pressure rollers 29, 30. The composite laminate then passes through heating oven 31 (much like oven 18) so as to dry the adhesive coating 28 and to evaporate any residual volatile substance from any of the liquid coatings used in preparing the composite assembled laminate held on carrier sheet 11.

Beyond the exit end of oven 31, the finished composite laminate 56 runs over an idler guide roll 57 whereat carrier sheet 11 is separated and stripped away from the composite laminate and thereafter taken up on a final drum (not shown) for subsequent re-use in repeating the overall procedure. At the same time composite laminate 56 is separated and stripped away from carrier 11 and runs over its respective idler guide roll 58 to be taken up on a final roller and collected, as desired, as a roll of the completed composite laminate.

The composite laminate then can be used to make any of the finished articles that can be fabricated from it. In the ordinary handling of the composite laminate in producing from it finished articles, such as handbags, luggage, wearing apparel, and others, a pleasing break is developed in its surface appearance. However, if it is desired to provide any such finished break in the composite laminate before producing finished articles from it, the completed laminate leaving oven 31 can be passed through a surface break development apparatus to crumple, twist, knead, or variedly vibrate it to develop such altered pleasing surface break appearance.

For example, the finished composite laminate 56 obtained in, say, a fifty-four inch width, is drawn through a surface break-developing loop 60, for example, of one inch internal diameter tubing bent into rectangular form (with rounded corners) of 15 inches side to side (internal) length by 8 inches top to bottom (internal) height. Loop 60 is suspended by an arm 61 from an oscillator (not shown) and by it subjected to a circular oscillating motion in a plane perpendicular to the direction of movement of the composite laminate. Such break-developing loop may be of any other suitable shape such as an oval or a circular ring (e.g. 24 inches I.d.) so long as its diameter is much smaller than the width of the laminate.

The latter can be unwound from the roll on which it is collected, to form a sagging loop and then pass through the break-developing ring and from it form another sagging loop, from which it is picked up and re-wound to its 54 inch width on a rewind roll. Alternatively, a modified surface break can be developed in it by putting the laminate (along its length) through a wringing treatment by twisting it (along its width) in a manner much like a towel is wrung.

As the starting base web or substrate, there may be used a fabric web such as any type of fabric that can be handled in web form, for example, any of the available textile fabrics made of natural fibers such as cotton (e.g. drill), or wool, or any of the synthetic fibers such as rayon, nylon, or any of the suitable polyesters and others, whether woven, knitted or non-woven as matted including pliable papers, or a pliable sheet or film of a synthetic material such as polyesters, polyvinyl chloride, polyvinyl esters of lower aliphatic acids such as polyvinyl acetate, and others; or even a composite such as a laminate of a fabric and any of the pliable synthetic films.

Whatever particular base web substrate, whether a fabric web or synthetic sheet or film, to use would be selected to provide the specifically desired properties in the finished composite laminate with respect to appearance, strength, flexibility, hand, and cost. The starting base web can be used in any suitable weight such as from about one-half ounce to about twenty ounces per square yard, and advantageously from about two to about twenty ounces per square yard.

Any kind of flock fibers that can adhere to any adhesive compatible with the fabric web or plastic sheet base can be used so long as they have suitable strength for the finished composite laminate desired. The flock fiber can be of natural source or synthetic, for example, cotton, wool, silk, cellulose acetate, rayon, polyvinylidene, or nylon, or mixed cotton and rayon, or polyester. The flock length can range from 0.2 to about 0.15 inch and beneficially from about 0.02 to about 0.04 inch with an average or peak at about 0.03, and its denier can be from about one to about 30 and advantageously from about 1.5 to 6. The longer the flock the coarser will be the surface appearance on subjecting the finished composite laminate to a breaking treatment.

The flock can be prepared by any particular type of flock cutting such as random or precision cut cotton or nylon, or modified acrylic or polyester, or suitable mixtures of any of them or any other flockable fiber.

FIG. 2 of the drawings illustrates the use of both electrostatic flocking combined with the mechanical method using beater bars. That combination with the electrostatic field being developed by alternating current is advantageously effective in the process herein. However, either the mechanical or electrostatic (either A.C. or D.C.) method alone, or any combination of them, can be used.

The flocking by electrostatic (A.C.) combined with beater bars, as used in the herein illustrated process, is effective for generally repeated uniform fiber orientation, density and bond.

The beater bars used in the mechanical method of flocking can be square in cross-section normal to the axis of the bars, or hexagonal or even better octagonal. They also can be cylindrical with full length rods equally peripherally spaced apart from one another around the surface and parallel to the axis as shown with beater bars 50 in FIG. 2 of the drawings. However, while four such rods are illustrated there, it is advantageous to use more such as six and better eight.

Any of the commonly available water-based flock adhesive compositions are suitable for binding the flock fibers to the base or substrate such as fabric base web. The water-based acrylic adhesives (which are available since the first half of 1964) show excellent resistance to washing and dry cleaning after they are cured to set. Among them are the water-based acrylic adhesives such as the "Rhoplex E32" water-based self-crosslinking acrylic copolymer latex (product of Rohm & Haas, Philadelphia, Pa.), also the water-based polyvinyl acetate, polyvinyl alcohol, and other cross-linking acrylic copolymer latex adhesives, as well as other water-based flock adhesive preparations including among them plastic latices such as those containing polyvinyl chloride, or acrylic esters. The selected adhesive should be compatible with the particular composition of the base layer or substrate to which the flock is to be applied.

Also available in the art are suitable solvent-based flock adhesive preparations, for example, rubber as such including styrene-butadiene rubber, and also nitrile rubber adhesives. It is also possible to use a solvent type of adhesive so long as its constitution is compatible with that of the specific base web to which it is to be applied. In some cases, it is also possible to use a hot melt adhesive so long as it is compatible with the base web material.

The amount of flock adhesive to use is governed by the respective nature of the flock and the substrate to which it is to be applied. It should provide from about one-quarter ounce to twenty, and advantageously from about two to about six, ounces of adhesive solids (on dry basis) per square yard of substrate.

The flock adhesive can be applied by any of the methods known in the flocking art for its application, such as the metering roll and applicator roll combination shown at any of the two different adhesive-applying stations in FIG. 2 of the drawings, or by doctor knife (over roll applicator), roller coating, reverse roller coating, and others, e.g., brushing.

Influenced by the properties desired in the end product composite laminate, flock can be applied in the range of from one-quarter ounce to about forty, and beneficially from one-half ounce to about seven, ounces of flock per square yard of substrate.

The outer surface skin coating or layer of a non-tacky pliable film-forming resin may be any of the pliable-film-forming resins that can be cast, for example, from solution in an inert solvent for it to provide such pliable film which can be released as by stripping from the carrier surface on which the solution of the resin is applied to form the desired film. Such resins, castable and releasable in their film formation, are the solvent-soluble, film-forming polyesterurethane condensation polymers, polyvinyl chloride polymers, polyvinyl chloride and acetate copolymers, the non-tacky, solvent-soluble acrylic acid polymers and methacrylic acid polymers and their copolymers, and the solvent-soluble non-tacky nitrile rubber polymers, for illustration but not to be restrictive.

These various non-tacky, pliable film-forming resins can be used to provide the surface skin layer film by using them in, for example, a minimum of about 18 to 20 and up to about 40 percent of the resin or polymer in the resulting solution of it in the inert solvent. Alternatively, these resins or polymers may be used in the form of a latex containing generally about this same range of concentration of them ordinarily in a compatible aqueous medium.

While presently it appears beneficial to prepare the desired film of the selected resin in either the foregoing solution or latex form, those of these applicable resins or polymers which can be melted to a spreadable viscous state without decomposition can be provided in the desired film for the skin layer by hot melt procedure.

Depending on the properties sought in the end product composite laminate, these applicable resins or polymers can be used as the outer surface skin layer in the form of a film of a thickness equivalent to that weighing from 0.05 ounce to about 10 ounces thereof, and advantageously within the range from about 0.2 ounce to about 2 ounces, per square yard of the film.

The above-described applicable resins or polymers applicable for providing the flexible outer surface skin layer for the finished composite laminate of the invention are known in the art and available either in their entirely solid state or in the form of suitable solutions or latices with the desired resin or polymer in, or readily dilutable to, the desired concentration within the above indicated range for them to be used in solution or latex form. Suitable inert solvents for these resins, and particularly for the polyesterurethane condensation polymer type, are, for example, dimethylformamide, toluene-isopropanol mixture, methyl ethyl ketone, and mixtures of the latter with dimethylformamide.

When the finished composite laminate is desired in some specific color (other than that resulting from the skin layer film itself), a sufficient amount of a suitable inert color pigment can be admixed with the solution of the pliable film-forming resin to provide the end product with the desired color.

The adhesive to be used for binding the flock to the outer surface skin layer of the composite laminate of the invention can be a solution of latex of any of the foregoing resins or polymers described as suitable for forming the desired film of that skin layer. In preparing these applicable resins or polymers in an applicable adhesive solution or latex form of them they can be used therein in a concentration such that when the solution or latex is dried or cured and set it leaves a film of adhesive solids in the range of from 0.05 to about 10 ounces, and advantageously within the range of from about 0.4 to about 3 ounces, per square yard depending on the properties sought in the end product composite laminate. Such adhesive solution or latex can contain the selected resin or polymer in a concentration to provide from about 20 to 40 percent of solids.

The preparation of an individual simulated leather faced composite laminate of the invention is illustrated by, but not limited to, the following example considered in light of the earlier above description of the invention in relation to the drawings:

To a web of cotton drill of 68 by 40 count and weighing 4.5 ounces per square yard there was applied by knife coating an adhesive film (which in the dry state gave a deposit of 3 ounces of adhesive solids per square yard of cotton) having the following composition in parts by weight:

"Rhoplex E-32" (self-crosslinking acrylic) aqueous
 emulsion _____ 95.25
Methylcellulose, as Union Carbide's "Methocel
 MC" standard (4000 cps.) _____ 0.75
Xylene _____ 3.0
10% aqueous solution of oxalic acid _____ 1.0 and thus having total solids of approximately 44 percent, with carbon black pigments being 4% of the total solids; and viscosity of 20,000 to 40,000 cps. by Brookfield viscosimeter using #7 spindle at 20 r.p.m.

With the foregoing adhesive application still wet and uncured, the thus coated cotton web was passed, with that adhesive film side up, through a flocking chamber (with suitably controlled humidity) over a bank of flock beater bars of hexagonal cross-section while flock (a blend of 15% cotton and 85% rayon fibers having a length ranging from 0.02 to 0.04 inch of average length of 0.03 inch and ranging from 1.5 to 5.0 denier) fell in a manner to impinge vertically onto the adhesive film. After leaving the flocking chamber the cotton web with the flock fibers set in the adhesive and extending vertically from it was passed through a curing oven held at 300° F. for a 20 minute cure.

At a separate station a solution of a fully reacted polyesterurethane condensation polymer (dissolved to the extent of one part of it by weight in four parts of dimethylformamide) was (i) cast to provide (on a dry weight basis) between 0.3 and 0.4 ounce per square yard of film on a continuous carrier sheet capable of later releasing the later dried film (the carrier sheet was the S. D. Warren Co. "Stripcote FER/CIS" silica and calcium carbonate coated, heavily calendared sheet), and (ii) then dried by being passed through an oven maintained at 200° F.

At a further station a fully reacted polyesterurethane condensation polymer adhesive solution was applied over the dried polyesterurethane condensation polymer layer on the carrier sheet, to provide an adhesive film leaving when dry a deposit of 1.2 to 1.4 ounces per square yard.

While the latter adhesive film was still wet and tacky, the exposed flocked face of the flocked cotton web was continuously laid over the semi-dried adhesive with the free ends of the flock fibers penetrating it. The thus joined adhesive-coated polyesterurethane film with the flocked cotton over it then were laminated together by being passed through the nip of opposed pressure rolls. The resulting composite then was passed through a tunnel-type curing oven maintained at 250° F. wherein the polyesterurethane condensation polymer adhesive coat was cured and set.

The completed composite laminate was cooled by passing it over a cooling roll. The carrier sheet then was stripped off and released from the finished product having a very leather-like appearance and feel. Its surface was practically completely like leather in its apparance and feel and thus very much distinctly different from the appearance and feel of prior synthetic surfaces embossed to appear like leather.

The "Rhoplex E-32" used in this example is a nonionic milky emulsion having a pH of about 3.2, solids content of 46%, with specific gravity at 25° C. of 1.05 and viscosity at 25° C. of 200 cps. by Brookfield viscosimeter using #1 spindle at 12 r.p.m., and is dilutable with water in all proportions.

In the foregoing example many different modifications may be made, for example, the cottom drill can be replaced by any other cotton web as well as by any other desired fabric web, which latter can be replaced by any suitable plastic sheet or film, all as earlier hereinabove indicated. The flock adhesive can be replaced, for example, by the commercial 55% polyvinylacetate latex or any other of the earlier above noted flock adhesives. The flock can have any color suitable for the color selected for the planned composite laminate, and so also can the base layer.

While the flock may be applied to the adhesive on the fabric web (or plastic film) base layer, by merely mechanical flocking as with use of beater bars, electrostatic flocking may be used separately or along with mechanical flocking, and with the electrostatic field being produced with either A.C. or D.C. current. The atmosphere in the flocking room or the flocking chamber can be controlled particularly as to its humidity as is well known in the flocking art.

The applicable fully reacted polyesterurethane condensation polymer used in solution to provide the outer surface skin coating in the foregoing example is a light stable polyesterurethane product of the beneficially catalytically enhanced reaction of (i) an aliphatic, particularly cycloaliphatic, di-isocyanate specifically a lower alkylene bis-(cyano-cyclohexane), namely, methylene bis-(4-cyano-cyclohexane), and (ii) a polyester terminating with hydroxyl at each end, having a molecular weight of from about 340 to about 1000 and an acid number below 5 and which advantageously is a caprolactone polyol and specifically poly epsilon-caprolactone, with (iii) the polymer chain length being extended by further reaction better with a lower alkylene diamine, particularly open chain alkylene and specifically ethylenediamine.

It occurs to be desirable that the ratio of starting polyester to the aliphatic di-isocyanate to the chain extender diamine to be used is such that no unreacted (i.e. free) polyester, di-isocyanate, or diamine remains after the reaction is completed. In other words, it is to be noted that the molar ratios of these reactants to one another ought so to be selected that the molar equivalents of the di-isocyanate used in the reaction is the sum of the molar equivalents of the polyester and of the diamine. For example, then one mole of the starting polyester would be used with two moles of the di-isocyanate and one mole of the diamine.

Thus, for example, the outer surface skin, as in the foregoing example, can be prepared by first reacting one mole equivalent of the foregoing caprolactone polyol with 2 mole equivalents of the methylene bis-(4-cyano-cyclohexane) in the presence of 0.002% (based on the total weight of the polyester and the di-isocyanate) of butyl tin dilaurate, by heating their mixture at 60 to 80° C. for an hour or two until the percent of isocyanate reaches the theoretical value, as determined by the regular control test used therefor.

Then toluene is added to this polyester-diisocyanate reaction product to the extent to provide a solution of 67% solids content. To that solution at room temperature there is added as rapidly as possible a suitable concentration solution of the molar equivalent of ethylenediamine (as the chain extender) in isopropyl alcohol (isobutyl alcohol, methylene chloride, or ethylene glycol monomethyl ether could be used) to the extent to provide a solution of 25% solids content. Chain extension with the diamine ordinarily is exothermic, but with the 25% solids solution is controlled readily. For example, with such rapid addition of that diamine solution to a 5 gallon charge 40° C. was reached in 5 minutes, and the batch cooled rapidly thereafter.

The resulting end product solution desirably with further suitable dilution serves as the polyesterurethane condensation polymer solution, from which the outer surface skin coating is cast according to the foregoing example and illustrates that the dimethylformamide solvent used therein can be replaced by other suitable solvents or mixed solvents for the polyesterurethane condensation polymer.

The fully reacted polyesterurethane condensation polymer used in solution to provide the adhesive solution that is applied to the outer surface skin coating in the foregoing illustrative example of the preparation of an overall unitary laminate is the product of the reaction of (i) a mononuclear aryl di-isocyanate, particularly ring-substituted as lower alkyl-substituted such as toluene-2,4-di-isocyanate, and (ii) a polyester broadly like the type used for the skin coat and illustrated by, but not limited to, hydroxy-poly(tetramethylene adipate), with (iii) the polymer chain length being extended by further reaction with an aliphatic glycol beneficially an alkane diol having, say, up to about 8 carbons as specifically 1,4-butanediol.

What has been said above (See col. 8, lines 16 to 27) applies likewise to the ratios in the procedure in the just preceding paragraph except by referring instead to its aromatic di-isocyanate and its aliphatic glycol chain extender. The polyesters can have a molecular weight from about 500 to about 5000 and can include such as are prepared, for example, by the esterification of a dicarboxylic acid as described in U.S. Pat. No. 2,871,218 of Jan. 27, 1959, column 2, lines 37 to 42 with a glycol such as described in that patent column 2, lines 46 to 53.

Thus, the polyesterurethane condensation polymer for use as the adhesive can be prepared by first also preparing a prepolymer by reacting 1 mole of the foregoing hydroxypoly(tetramethylene adipate) with 2 mole equivalents of toluene-2,4-diisocyanate at elevated temperature not exceeding 100° C. until the theoretical isocyanate value is reached (as found by the known control test therefor), and adding to their reaction product toluene to the extent to provide a solution of 65% solids content.

The chain length of this prepolymer then is extended by adding to it a solution of 1,4-butanediol in any compatible solvent such as toluene, dimethylformamide, methyl ethyl ketone, or suitable blends of any of them to the extent to provide a solution of 35% solids content.

The mononuclear aryl diisocyanate toluene-2,4-diisocyanate can be replaced by any other compatible suitable aromatic diisocyanate such as, but not limited to any of those disclosed in Pat. 2,871,218 column 2 line 72 to column 3, line 6. The aliphatic diisocyanate methylene bis-(4-cyanocyclohexane) can be replaced by any other compatible suitable aromatic diisocyanate such as, but not limited to any of those disclosed in Pat. 2,871,218 column 2, line 72 to column 3, line 6. The aliphatic diisocyanate methylene bis-(4-cyanocyclohexane) can be replaced by any other compatible suitable aliphatic diisocyanate such as, but not limited to any of those disclosed in U.S. Pat. No. 3,531,364, column 1, lines 61 to 72.

The specific polyesterurethane condensation polymers described shortly above as used respectively in the solution for casting the outer skin surface coating and the adhesive film applied over it in the last above illustrative example for preparing an overall unitary laminate can be replaced respectively by any other compatible suitable fully reacted polyesterurethane condensation polymer, as well as by any of the blocked type polyurethanes, and also by any of the two component systems or other type of the polyurethane resin.

When any specifically colored end product overall laminate is desired, the specifically colored, inert inorganic pigment is incorporated in the dispersion from which the outer surface skin coating is to be cast and in the adhesive dispersion to be applied over it. In addition, any textile flock fibers as well as any textile fabric used as the base layer may be dyed in the same color. Any plastic film to be used as a base stratum or layer is to be colored similarly with the corresponding pigment.

Suitable air conditioning to avoid undesirable static interference with the flock to be applied can have the relative humidity at from a minimum of 40% to a maximum of 60%, with the temperature within the range of from 60 to 90° F.

While the invention has been explained by detailed description of certain specific embodiments of its various parts, it is understood that various modifications and/or substitutions can be made in any of them within the scope of the appended claims which are intended to cover equivalents of the various specific embodiments.

What is claimed is:

1. A pliable laminated sheet material having an outer simulated leather face and comprising:
   (i) a pliable fabric or plastic film base layer,
   (ii) a pliable, dry film of flock adhesive integrally adhering to the inner surface of said base layer,
   (iii) an outer surface skin coating of a non-tacky, set, pliable film-forming resin,
   (iv) a pliable, dry film of flock adhesive integrally adhering to the inner surface said skin coating,
   (v) a dense layer of flock having one end of its individual flock fibers integrally imbedded in the adhesive film affixed to the inner surface of said fabric or plastic film base layer and substantially all of said fibers extending in substantially parallel array to one another outwardly from said base layer and with their other end being integrally imbedded in said flock adhesive adhering to the underside of said outer skin surface, thereby linking the latter together with said base layer through said intermediate flock layer into an overall unitary, pliable laminate:
the density of said flock and the length of the individual flock pieces being such that the spacing between the underside of said surface film and the inner side of said base layer is indiscernible to the naked eye.

2. A laminated sheet material as claimed in claim 1, wherein said fiber base layer is a textile fabric.

3. A laminated sheet material as claimed in claim 2, wherein the textile fabric is a member of the class consisting of woven, knit, and non-woven fabrics.

4. A laminated sheet material as claimed in claim 3, wherein said fabric is cotton.

5. A laminated sheet material as claimed in claim 1, wherein said outer surface skin coating is a film of a polyesterurethane condensation polymer.

6. A laminated sheet material as claimed in claim 1, wherein said outer surface skin is colored to a desired color.

7. A laminated sheet material as claimed in claim 6, wherein said base layer and the intermediate flock layer have the same color as the outer surface skin.

8. The method of preparing a pliable laminated sheet material having an outer face appearance of simulated leather, which method comprises releasably applying over a relatively liquid impermeable release-capable surface of an elongated carrier sheet a continuous coating of a solution, in a readily volatizable solvent, of a film-forming resin which sets to a continuous non-tacky, flexible film releasable from said carrier sheet;
converting said coating into its set, non-tacky flexible film state;
separately applying a substantially uniform, continuous coating of a flock adhesive over the surface of one side of an elongated flexible layer of a base selected from a web of fabric and a flexible plastic film;
while said adhesive still is wet applying over it a dense layer of flock by flock-applying means which enable said flock fibers to become imbedded in said adhesive with the individual flock fibers held therein at one end and extended relatively perpendicular to said fabric web and in substantially parallel array to one another;
converting said flock adhesive to its non-tacky and dry flexible state;
applying over the exposed surface of said non-tacky flexible film supported on the carrier sheet a substantially uniform, continuous coating of a flock adhesive compatible with said film to provide integral adherence to it;
while said latter adhesive still is wet bringing said adhesive wetted flaxible film together with the flocked surface of said flexible base layer to enable the extended outer ends of said individual flock fibers to contact said still wet adhesive and become imbedded therein; and
converting said still wet adhesive on said flexible base layer to its non-tacky and set state;
thereby providing an overall unitary laminate with said flexible resin film having its outer simulated leather appearance, held integrally together with said layer through the intermediate layer of flock integrally adhering to both of them.

9. The method as claimed in claim 8, wherein an electrostatic field is provided in the zone wherein the flock fibers are falling to become imbedded in said flock adhesive.

10. The method as claimed in claim 9, wherein said electrostatic field is provided by alternating current, and the underside of said base layer is agitated as by impacts from beater bars as the flack fibers are falling through the electrostatic field to become imbedded in said flock adhesive.

11. The method as claimed in claim 8, wherein said overall unitary laminate is separated from said elongated carrier sheet.

12. The method as claimed in claim 11, wherein said overall unitary laminate is subjected to an outer skin surface breaking action by a surface break development apparatus to emphasize its simulated leather appearance.

References Cited

UNITED STATES PATENTS

| | | | |
|---|---|---|---|
| 3,363,265 | 1/1968 | Dunmire | 161—64 |
| 3,575,751 | 4/1971 | Mizell | 156—72 |

WILLIAM J. VAN BALEN, Primary Examiner

U.S. Cl. X.R.

156—72

UNITED STATES PATENT OFFICE
CERTIFICATE OF CORRECTION

Patent No. 3,684,637                    Dated August 15, 1972

Inventor(s) ALBERT E. ANDERSON ET AL

It is certified that error appears in the above-identified patent and that said Letters Patent are hereby corrected as shown below:

Column 1, line 7, after "06360" insert -- , assignors to Pervel Industries, Inc., a Delaware corporation of Plainfield, Connecticut 06374. --; column 3, line 50, after "in" insert a comma (,); column 4, line 2, "finished" should read -- finish --; line 57, "0.2" should read -- 0.02 --; column 6, line 39, "of", first occurrence, should read -- or --; column 7, line 10, after "chamber" insert a comma (,); column 9, lines 26 to 30, omit the sentence beginning with "The aliphatic diisocyanate" and ending with "line 72 to column 3 line 6."; column 10, line 60, "flaxible" should read -- flexible --; line 69, after "said", insert -- base --.

Signed and sealed this 8th day of May 1973.

(SEAL)
Attest:

EDWARD M. FLETCHER, JR.              ROBERT GOTTSCHALK
Attesting Officer                    Commissioner of Patents